United States Patent Office 3,488,706
Patented Jan. 6, 1970

3,488,706
NOVEL POLYMERS CONTAINING QUATERNARY AMMONIUM GROUPS
Hyman L. Cohen and Louis M. Minsk, Rochester, N.Y., assignors to Eastman Kodak Company, Rochester, N.Y., a corporation of New Jersey
No Drawing. Filed Mar. 1, 1968, Ser. No. 709,783
Int. Cl. G03c 1/72, 5/54
U.S. Cl. 96—29    11 Claims

ABSTRACT OF THE DISCLOSURE

Novel polymers containing quaternary ammonium groups. In one aspect these polymers provide good mordants for acid dyes in basic systems. In another aspect the novel polymers can be used in dye imbibition blanks to provide improved dye retention.

---

This invention relates to novel polymeric compounds. In one aspect this invention relates to novel polymeric compounds containing quaternary ammonium groups which are useful as dye mordants. In another aspect this invention relates to new photographic materials which contain said dye mordants and processes for using said photographic materials.

It is known that various mordanting materials can be used, for example in imbibition printing, photographic products containing filter layers, antihalation layers, etc., to prevent migration of dyes. Many of these mordanting materials have good dye retention only under specific acid or base conditions and in many cases have good retention for only specific classes of dyes. In particular it is known that good dye mordants can be provided according to Minsk and Cohen, U.S. Patents 3,048,487, issued Aug. 7, 1962, and U.S. Patent 3,184,309, issued May 18, 1965, which mordants have good dye retention, especially under acidic conditions. It is desirable to provide good mordants which can be used under other conditions, especially in basic environments.

Therefore, it is an object of this invention to provide new mordant compounds.

It is another object of this invention to provide novel polymeric mordants which have good dye mordanting properties in basic environments.

It is another object of this invention to provide new emulsions containing dye mordants which can be used in photographic elements.

It is still another object of this invention to provide new photographic elements.

These and other objects of the invention are accomplished by novel interpolymers which comprise quaternized units having the formula:

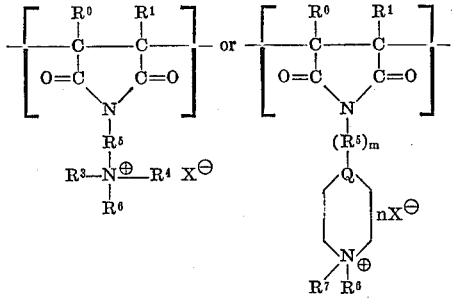

wherein $R^0$ and $R^1$ each represent either hydrogen atoms or lower alkyl groups of 1 to 7 carbon atoms; $R^3$, $R^4$, $R^6$, and $R^7$ each represent a lower alkyl group such as methyl, ethyl, n-propyl, n-butyl, t-butyl and the like, or $R^3$ and $R^4$ can together with the nitrogen atom to which they are bonded represent the atoms necessary to complete a mono-aza heterocyclic ring such as a 1-piperidino ring, morpholino, and the like, $R^5$ represents a straight or branched chain alkylene group such as methylene, ethylene, propylene, butylene and preferably an alkylene group containing from 2 to 3 carbon atoms. Q is a nitrogen atom, a

radical, or the carbon atom radical

$X^\ominus$ is the negative salt forming atom or radical such as halide, sulfate, sulfonate for example, p-toluenesulfonate, phosphate, and the like, $m$ is 0 or 1, and $n$ is 1 or 2, and $n$ is 1 when Q is

and $n$ is 2 when Q is

and $m$ is 1.

In a preferred embodiment the interpolymers comprising quaternized units having the following formula:

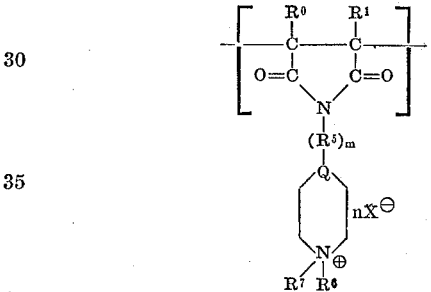

wherein $R^0$, $R^1$, $R^5$, $R^6$, $R^7$, $X^\ominus$, $m$, $n$ and Q are as defined above.

The interpolymers of this invention are copolymers comprising the quaternized units above and at least one other unit of an ethylenically unsaturated monomer. Interpolymers of this type are referred to as ethenic polymers. Typical ethylenically unsaturated monomers which can be used to form ethenic polymers according to this invention include ethylene, propylene, 1-butene, isobutene, 2-methylpentene, di-isobutylene, 2-methylbutene, styrene, α-methylstyrene; monoethylenically unsaturated esters of aliphatic acids such as vinyl acetate, isopropenyl acetate, allyl acetate, etc.; esters of ethylenically unsaturated monocarboxylic acids or dicarboxylic acids such as methyl acrylate, methyl methacrylate, ethyl acrylate, diethyl methylene malonate, etc.; monoethylenically unsaturated compounds such as acrylonitrile, allyl cyanide; and dienes such as butadiene and isoprene. In one embodiment a preferred class of ethylenically unsaturated monomers which may be used to form the ethenic polymers of this invention includes the lower 1-alkenes having from 1 to 4 carbon atoms, 1,3-dienes of 4 to 8 carbon atoms, and styrene.

The interpolymer can comprise the quaternized unit in copolymerized relation with only one other ethenic unit, or several other ethenic units can be present in the interpolymer including like units which have not been quaternized. The quaternized unit can comprise from 10 to 100 mole percent of the units of said interpolymer and preferably from 30 to 100 mole percent depending on the particular monomers. In a preferred embodiment 25 to about 70 mole percent of units of ethylene or styrene are in copolymerized relationships with the quaternized unit.

The polymeric mordants of this invention are generally prepared from interpolymers of maleic anhydride or maleimide and another ethylenically unsaturated monomer. It is known that maleic anhydride does not easily form high molecular weight homopolymers under the usual conditions of polymerization, although it does form interpolymers with a wide variety of monoethylenically-unsaturated compounds of the vinyl and vinylidene type. Maleic anhydride generally enters these polymerizations in a molar ratio of 1:1 so that about 50 percent of the units of the final polymer are derived from maleic anhydride. On the other hand, homopolymers of maleimide are known, as well as copolymers of maleimide and other ethylenically-unsaturated monomers, wherein the amount of units derived from maleimide varies so that the units of maleimide in the final polymer is more or less than 50 percent. Polymers of this type are disclosed in copending application entitled "Processes for Preparing Substituted Maleimide Polymers" by Cohen, filed on even date herewith. Polymers such as prepared by this process are preferably used to form the quaternized polymers of this invention when low amounts of styrene units are present in the interpolymer.

Such interpolymers are then reacted with a compound containing at least one tertiary amine substituent and a primary amine substituent to form the unquaternized precursors to the mordants of this invention. The amine-containing compounds which can be recated with the interpolymers can be represented by the structures:

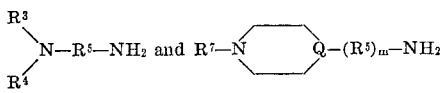

wherein $R^3$, $R^4$, $R^5$, $R^7$, $m$ and $Q$ are as defined above.

The reaction of the amine and the interpolymer may be conducted by heating them in an inert solvent or under an inert atmosphere for a time sufficient to achieve the desired degree of reaction. The heating can be conducted at temperatures approaching the degradation temperature of the reactants and desired products but ordinarily is effected in the range of about 100 to 150° C. Reaction times and conditions will vary, of course, depending upon the specific reactants employed. For certain reactants, inert reaction solvents can be used such as dioxane, toluene, dimethylformamide, xylene, etc.

In accordanec with this invention the tertiary amine-containing groups appended to the maleimide units of the interpolymers can be quaternized to provide good dye mordants. In one aspect of this invention, polymers having the quaternized units are mordants which retain dyes much better under basic conditions than the acid salt of the corresponding unquaternized compounds. Conveniently, the quaternization can be effected by using an alkylating agent which can be represented by the structure $R^6X$ wherein $R^6$ is an aliphatic radical of from 1 to 4 carbon atoms, such as methyl, ethyl, propyl, butyl, and the like; X is a negative, monovalent salt forming atom or radical such as monoalkyl sulfate, sulfonate, dialkyl phosphate, halide, etc. All of the units above can be quarternized or only a portion of them need be quaternized depending on the desired property of the mordant. The quarternization may be effected in a polar solvent such as water, dimethylformamide, dimethylsulfoxide, dimethylacetamide, or an alcohol such as methanol, ethanol, isopropanol, Cellosolve and the like. Generally, the quaternization is carried out to quaternize at least 50 percent of the tertiary nitrogen atoms attached to the said maleimide units. Temperatures from room temperature to 125° C. or more are generally used and if quaternization of only a part of the tertiary nitrogen atoms is desired, the amount of quaternizing agent may be reduced to correspond with the number of tertiary nitrogen atoms to be converted.

It is to be understood that certain of the quaternary compounds of this invention can be prepared by alternate procedures, for example, by the reaction of an N-(haloalkyl substituted)-maleimide interpolymer with a tertiary amine to provide the quaternized polymer. The maleimide interpolymer employed in this procedure can be obtained by the reaction of a haloalkylamine acetate salt with a maleic anhydride interpolymer in the manner described above for the preparation of the tertiary amine substituted interpolymers.

Mordanting amounts of the novel polymers of the invention can be incorporated in water-permeable hydrophilic organic colloids or other polymeric binder materials and the resulting mixture used in the preparation of dye imbibition printing blanks and receiving layers for color transfer processes, such as those described in Rogers U.S. Patent 2,983,606 and Whitmore U.S. Patent 3,227,552 and U.S. Patent 3,227,550. Satisfactory colloids which can be used for this purpose include any of the hydrophilic colloids generally employed in the photographic field, including, for example, gelatin, colloidal albumin, polysaccharides, cellulose derivatives, synthetic resins such as polyvinyl compounds, including poly(vinyl alcohol) derivatives, acrylamide polymers and the like. In addition to the hydrophilic colloids, the vehicle or binding agent can contain colloids such as dispersed polymerized vinyl compounds, particularly those which increase the dimensional stability of photographic materials. Suitable compounds of this type include water-insoluble polymers and copolymers of alkyl acrylates or methacrylates.

The quantity of mordant employed in the water-permeable colloid can be varied, depending upon the particular mordant and its chemical characteristics, as well as the dyes to be fixed in the mordanting layer. In general, the quantity of mordant should be at least 10 percent by weight, based on the weight of hydrophilic colloid. Larger amounts of mordant can be employed in the hydrophilic colloid layers and amounts as high as 50 percent by weight, based on the weight of the hydrophilic colloid, give quite useful results.

The mordants can also be used for fixing the dyes, and particularly acid dyes, used in the preparation of photographic filter, antihalation or gelatin-silver halide emulsion layers. Such layers can be coated on conventional photographic supports, such as flexible sheet supports (e.g., cellulose acetate, polyester films, polyvinyl resins, etc.) or paper, glass, etc.

The invention can be further illustrated by the following examples of preferred embodiments thereof, although it will be understood that these examples are included merely for the purposes of illustration unless otherwise specifically indicated.

EXAMPLE I

Preparation of copoly[styrene-N-(γ-maleimidopropyl)-N,N,N-trimethylammonium p-toluenesulfonate]

A solution of 20.2 g. (0.1 mole) of styrene-maleic anhydride interpolymer in 200 ml. of dimethylformamide is added slowly to a solution of 14 g. (0.14 mole) of γ-dimethylaminopropylamine in 200 ml. of dimethylformamide to form a white, gummy precipitate. When the reaction is carried out on a steam pot, the precipitate slowly dissolves. However, cooling the mixture causes precipitation to occur.

The solution is slowly distilled with stirring until 100 ml. of distillate is collected. The still pot temperature slowly rises from 115 to 150° C. during this procedure. On cooling there is no precipitate. The product precipitates as a friable powder on pouring into water. It is washed with water, filtered and vacuum dried.

*Analysis.*—C, 70.5, 70.7; H, 7.7, 8.0; N, 9.4, 9.4.

One hundred ninety-five grams of the polymer thus prepared is dissolved in 2 liters of dimethylformamide with mechanical stirring at room temperature. Six hundred fifty grams (3.45 mole) of methyl p-toluenesulfonate is stirred in and the solution allowed to stand at room temperature for four days.

The polymer is precipitaed in 16 liters of acetone. The white granular precipitate is washed three times in 3 liter portions of acetone.

The precipitate is filtered, pressed dry and redissolved in 1 liter of methanol. The methanol dope is treated with 10 g. of decolorizing carbon at 60° C. The carbon is filtered out on a Filtrol pad, with suction. The filtrate is precipitated in 15 liters of acetone. The precipitate is washed three times with 4 liter portions of acetone, filtered and pressed dry under a rubber dam, and dried at reduced pressure for three days at room temperature. Yield, 180 g.

*Analysis.*—Calcd.: N, 5.9; S, 6.7. Found: N, 5.5; S, 6.5.

The following Examples II–IX are prepared using the same procedure employed in Example I.

EXAMPLE II

Preparation of copoly[styrene-N-($\gamma$-moleimidopropyl)-N,N,N-trimethylammonium methanesulfonate]

The above polymer is prepared from 20 g. of copoly-[styrene-$\gamma$-dimethylaminopropylmaleimide] and 15 g. of methyl methanesulfonate in 200 ml. of dimethylformamide by the method described in Example I. Yield, 10 g.

*Analysis.*—Calcd.: C, 58.8; H, 7.0; N, 6.4; S, 7.5.

EXAMPLE III

Preparation of copoly[styrene-N-($\beta$-maleimidoethyl)-N,N-diethyl-N-methylammonium p-toluenesulfonate]

The above is prepared according to the procedure of Example I from 23 g. of copoly[styrene-diethylaminoethylmaleimide] and 20 g. of methyl p-toluenesulfonate in 200 ml. of dimethyl sulfoxide. Yield, 23 g.

*Analysis.*—Calcd.: C, 63.5; H, 7.1; N, 5.8; S, 6.7.

EXAMPLE IV

Preparation of copoly[ethylene-N-($\gamma$-maleimidopropyl)-N,N,N-trimethylammonium p-toluenesulfonate]

The above is prepared according to the procedure of Example I from 10.5 g. of copoly[ethylene-$\gamma$-dimethylaminopropylmaleimide] and 18.4 g. of methyl p-toluenesulfonate in 100 ml. of dimethylformamide. Yield, 15 g.

*Analysis.*—Calcd.: C, 51.1; H, 7.3; N, 5.0; S, 11.2.

EXAMPLE V

Preparation of copoly[ethylene-N-($\gamma$-maleimidopropyl)-N,N-dimethyl-N-ethylammonium ethosulfate]

The above is prepared according to the procedure of Example I from 5.2 g. of copoly[ethylene-$\gamma$-dimethylaminopropylmaleimide] and 6.3 g. of ethyl sulfate in 75 ml. of dimethylformamide. Yield, 9 g.

*Analysis.*—Calcd.: C, 44.6; H, 7.6; N, 6.6; S, 10.6.

EXAMPLE VI

Preparation of copoly[styrene-N-($\gamma$-maleimidopropyl)-N,N-diethyl-N-methylammonium p-toluenesulfonate]

The above is prepared according to the procedure of Example I from 20 g. of copoly[styrene-$\gamma$-diethylaminopropylmaleimide] and 27 g. of methyl p-toluenesulfonate in 200 ml. of dimethylformamide. Yield, 15 g.

*Analysis.*—Calcd.: C, 64.1; H, 7.1; N, 5.3; S, 5.9.

EXAMPLE VII

Preparation of copoly[tetramethylbutadiene-N-($\gamma$-maleimidopropyl)-N,N,N-trimethylammonium p-toluenesulfonate]

The above is prepared according to the procedure of Example I from 20 g. of copoly[tetramethylbutadiene-dimethylaminopropylmaleimide] and 60 g. of methyl p-toluenesulfonate in 300 ml. of acetone. Yield, 28.9 g.

*Analysis.*—Calcd.: C, 63.7; H, 7.9; N, 5.9; S, 6.7.

EXAMPLE VIII

Preparation of copoly[styrene-N-($\beta$-maleimidoethyl)-N,N,N-trimethylammonium p-toluenesulfonate]

The above is prepared according to the procedure of Example I from 17 g. of copoly[styrene-dimethylaminoethylmaleimide] and 25 g. of methyl p-toluene sulfonate in 150 ml. of dimethyl formamide. Yield, 9 g.

*Analysis.*—Calcd.: C, 62.5; H, 6.8; N, 5.3; S, 6.5.

EXAMPLE IX

Preparation of copoly[styrene-N-($\delta$-maleimido butyl)-N,N,N-trimethylammonium p-toluenesulfonate]

The above is prepared according to the procedure of Example I from 20 g. of copoly[styrene-dimethylaminobutylmaleimide] and 25 g. of methyl p-toluenesulfonate in 200 ml. of dimethylformamide. Yield, 30 g.

*Analysis.*—Calcd.: C, 64.8; H, 7.1; N, 5.2; S, 6.5.

EXAMPLE X

Preparation of copoly(styrene-1-maleimido-4,4-dimethylpiperazinium p-toluenesulfonate)

A solution of 40.4 g. (0.2 mole) of styrene-maleic anhydride interpolymer having a styrene to maleic anhydride mole ratio of 1:1 in 250 ml. of dioxane is added dropwise with stirring to a solution of 24.5 g. (0.25 mole) of 4-amino-1-methylpiperazine in 250 ml. of dioxane while the latter is heated on a steam bath. Following addition, heating and stirring are continued for an additional hour after which 51 g. (0.5 mole) of acetic anhydride are added and the resulting solution heated for an additional hour. Upon cooling the solution is poured into ether to precipitate copoly(styrene-1-maleimido-4-methylpiperazine).

Fourteen grams of the resulting product and twenty grams of methyl-p-toluenesulfonate are then heated in 150 ml. of dimethylformamide at 100° C. overnight. Yield: 17 g.

*Analysis.*—C, 67.7; H, 7.0; N, 6.7; S, 6.2.

EXAMPLE XI

Preparation of copoly(ethylene-1,1-dimethyl-4-maleimidomethylpiperidinium p-toluenesulfonate)

Eighteen grams of copoly(ethylene-1-methyl-4-maleimidomethylpiperidine) is prepared from a maleic anhydride-ethylene interpolymer mole ratio of anhydride to ethylene of 1:1 and 1-methyl-4-aminomethylpiperidine using the general procedure of Example I, and then is heated with 37 g. methyl p-toluenesulfonate in 180 ml. dimethylformamide also as in Example I. Yield: 23 g.

*Analysis.*—Calcd.: C, 58.5; H, 7.5; N, 5.8; S, 6.4.

EXAMPLE XII

Preparation of copoly (styrene-4-maleimidomethyl-1,1-dimethylpiperidinium p-toluenesulfonate)

Nineteen grams of copoly(styrene-4-maleimidomethyl-1-methylpiperidine) is prepared from a styrene-maleic anhydride interpolymer having a mole ratio of styrene to maleic anhydride of 1:1 and 1-methyl-4-aminomethylpiperidine by the general procedure of Example I and is then heated with 30 g. methyl p-toluenesulfonate in 150 ml. dimethylformamide also as in Example I. Yield: 17 g.

*Analysis.*—Calcd.: C, 64.5; H, 7.0; N, 5.1; S, 4.9.

EXAMPLE XIII

The quaternized polymers of this invention have superior mordanting properties in comparison with the respective free base. The following two mordants are each dissolved in a high-boiling water-immiscible solvent and dispersed in an aqueous gelatin solution as described below:

(I) Copoly[styrene-N-($\gamma$ - maleimidopropyl)-N,N,N-trimethylammonium p-toluenesulfonate] Example I).

(II) Copoly(styrene- N,N -dimethylaminopropylmaleimide).

A 0.5 g. portion of mordant is dissolved in 0.5 cc. of di-n-butyl phthalate and 3 cc. of ethyl alcohol by heating to the reflux temperature of the mixture. The resulting solution is emulsified by mixing it with agitation in a solution of 22 cc. of 10 percent by weight aqueous gelatin solution containing 2 cc. of 5 percent by weight aqueous solution of the surfactant sodium diisopropylnaphthalenesulfonate. The oil-in-water emulsion is passed through a colloid mill 5 times to disperse the suspended droplets of mordanted solution more finely and is then chilled to gel the composition, substantially all of the droplets being less than 2 microns in size. The gel is cut up and dried to remove the water and alcohol leaving the mordant highly concentrated in the water-immiscible solvent droplets substantially uniformly distributed through the composition. The composition can be dried to facilitate storage if desired.

Receiving sheets for use in an image transfer color process are prepared as follows:

Two grams of each of the dry mordanting compositions prepared above are redispersed by adding to 21 cc. of water and 1.5 cc. of 7.5 percent by weight aqueous saponin solution and heating with stirring at 40° C. The dispersions are then coated on subbed cellulose acetate film supports at a wet thickness of 0.009 inch and dried.

Diffusible acid dyes obtained from the following couplers are mordanted in the above receiving sheets according to the following procedure:

coatings containing 90 mg. of coupler per 1000 sq. cm., 100 mg. of silver per 1000 sq. cm. and 300 mg. of gelatin per 100 sq. cm. Samples of the coatings are exposed to a negative and developed for 5 minutes at 75° C. in contact with the receiving sheets using a color developer solution having the composition:

| | |
|---|---|
| Benzyl alcohol | cc__ 10.0 |
| Ascorbic acid | g__ 0.2 |
| Potassium bromide | g__ 0.7 |
| Sodium carbonate·$H_2O$ | g__ 20.0 |
| Sodium hydroxide | g__ 2.0 |
| 4-amino-N-ethyl-N-($\beta$-hydroxyethyl)aniline | g__ 10.0 |
| Water to make one liter. | |

The soluble acid dye images formed during development by the reaction of the couplers with the oxidized developing agent are transferred to, and mordanted in, the receiving sheets. The receiving sheets are then washed in water and the image densities are measured on a densitometer. The cyan, magenta, and yellow dyes are all washed out of the receiving sheet samples containing the mordant II, but the dye remains fast in the receiving sheets containing the mordant I and the mordanted dye images have good density as shown in the following table.

| | Density (dye) | | |
|---|---|---|---|
| | Cyan | Magenta | Yellow |
| Mordant: | | | |
| I | 1.48 | 2.40 | 1.25 |
| II | 0 | 0 | 0 |

EXAMPLE XIV

The following mordants are tested as described in Example XIII, and the density of each sample is recorded in the accompanying table.

| Polymer | Density | | |
|---|---|---|---|
| | Cyan | Magenta | Yellow |
| Copoly[styrene—N,N-dimethylaminopropylmaleimide] | 0 | 0 | 0 |
| Copoly[styrene—N-($\gamma$-maleimidopropyl)-N,N,N-trimethylammonium methanesulfonate] (Example II) | 1.64 | 2.38 | 1.30 |
| Copoly[styrene—N-($\beta$-maleimidoethyl)-N,N-diethyl-N-methyl ammonium p-toluenesulfonate] (Example III) | 1.70 | 2.28 | 1.24 |
| Copoly[ethylene—N,N-dimethylaminopropylmaleimide] | 0 | 1.76 | 0 |
| Copoly[ethylene—N-($\gamma$-maleimidopropyl)-N,N,N-trimethylammonium p-toluenesulfonate] (Example IV) | 0 | 2.67 | 0 |
| Copoly[ethylene—N-($\gamma$-maleimidorpopyl)-N,N-dimethyl-N-ethylammonium ethosulfate] (Example V) | 0 | 2.63 | 0 |
| Copoly[styrene—N-($\gamma$-maleimidopropyl)-N,N-diethyl-N-methylammonium p-toluenesulfonate] | 1.75 | 2.44 | 1.34 |
| Copoly[styrene—N-($\gamma$-maleimidoethyl)-N,N,N-trimethylammonium p-toluene-sulfonate] (Example VIII) | 1.54 | 2.47 | 1.38 |
| Copoly[styrene—N-($\delta$-maleimidobutyl-N,N,N-trimethylammonium p-toluenesulfonate] (Example IX) | 1.63 | 2.32 | 1.29 |
| Copoly[ethylene-N-($\gamma$-maleimidocarboxamidopropyl)-N,N,N-trimethylammonium p-toluenesulfonate] | 0.94 | 2.74 | 0.74 |
| Copoly{ethylene—N-[$\gamma$-(3-maleimidoureidopropyl)]-N,N,N-trimethylammonium p-toluene-sulfonate} | 1.15 | 2.34 | 0.90 |
| Copoly{styrene—N-[$\gamma$-(3-maleimidoureidopropyl)]-N,N,N-trimethylammonium p-toluene-sulfonate} | 1.74 | 2.22 | 1.56 |
| Copoly(styrene—1-maleimido 4,4-dimethylpiperazinium p-toluenesulfonate) | 1.48 | 2.44 | 1.25 |
| Copoly(ethylene—1,1-dimethyl-4-maleimidomethylpiperidinium p-toluenesulfonate) (Example XI) | 0 | 1.92 | 0 |
| Copoly(styrene—4-maleimido-methyl-1,1-dimethylpiperidinium p-toluenesulfonate) (Example XII) | 0 | 1.80 | 0.84 |

The couplers used are:

(A) 2-(3,5-disulfobenzamido) - 4 - (3-octadecylcarbamylphenylthio)-5-methylphenol dipotassium salt. (Cyan dye-forming coupler.)

(B) 1-phenyl-3-(3,5-disulfobenzamido)-4-(2-hydroxy-4-pentadecylphenylazo)-5-pyrazolone dipotassium salt. (Magenta dye-forming coupler.)

(C) $\gamma$-benzoyl-$\gamma$-(3 - octadecylcarbamylphenylthio-3,5-dicarboxyacetanilide. (Yellow dye-forming coupler.)

Each of the above couplers is incorporated into separate single-layer gelatin silver bromoiodide emulsion In each instance the quaternized mordant of this invention provided much better dye retention than the corresponding acid salt of the respective mordant when used in a basic medium.

The invention has been described in considerable detail with reference to preferred embodiments thereof, but it will be understood that variations and modifications can be effected within the spirit and scope of the invention as described hereinabove and as defined in the apended claims.

We claim:

1. A photographic element comprising a support and having a layer which comprises a polymer comprising units of the formula:

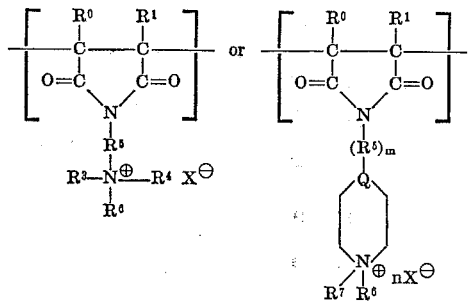

wherein $R^0$ and $R^1$ each represent hydrogen atoms or lower alkyl groups, $R^3$, $R^4$, $R^6$ and $R^7$ each represent lower alkyl groups or $R^3$ and $R^4$ can, together with the nitrogen atom to which they are bonded, represent the atoms necessary to complete a monoaza heterocyclic ring, $R^5$ represents an alkylene group, Q is a nitrogen atom, a

radical or a carbon radical, $X^\ominus$ is a negative salt-forming atom or radical, m is 0 or 1, and n is 1 or 2, and n is 1 when Q is a carbon radical, and n is 2 when Q is

and m is 1.

2. A photographic element according to claim 1 wherein said interpolymer comprises units of at least one other ethylenically unsaturated monomer.

3. A photographic element according to claim 1 wherein said interpolymer comprises units of a styrene monomer.

4. A photographic element according to claim 1 wherein said interpolymer comprises from about 30 mole percent to about 100 mole percent of the units of claim 13.

5. A photographic element according to claim 1 wherein said interpolymer comprises from 25 mole percent to about 70 mole percent of units of a styrene monomer.

6. A photographic element according to claim 1 wherein said interpolymer comprises units of the formula:

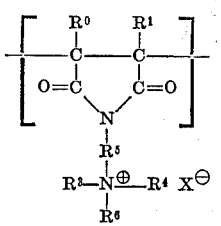

wherein $R^0$ and $R^1$ each represent hydrogen atoms or lower alkyl groups, $R^3$, $R^4$ and $R^6$ each represent lower alkyl groups or $R^3$ and $R^4$ can, together with the nitrogen atom to which they are bonded, represent the atoms necessary to complete a monoaza heterocyclic ring, $R^5$ represents an alkylene group, and $X^\ominus$ is a negative salt-forming atom or radical.

7. A photographic element according to claim 6 additionally comprising at least one other hydrophilic colloid.

8. A photographic element according to claim 1 wherein said interpolymer comprises units of the formula:

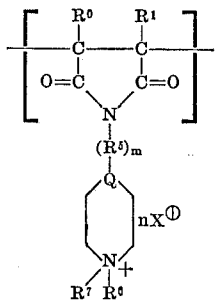

wherein $R^0$ and $R^1$ each represent hydrogen atoms or lower alkyl groups, $R^6$ and $R^7$ each represent lower alkyl groups, $R^5$ represents an alkylene group, Q is a nitrogen atom, a

radical or a carbon radical, $X^\ominus$ is a negative salt-forming atom or radical, m is an integer of 0 or 1, and n is an integer of 1 or 2, and n is 1 when Q is a carbon radical and n is 2 when Q is a

radical and m is 1.

9. A photographic element according to claim 8 additionally comprising at least one other hydrophilic colloid.

10. A dye imbibition printing blank comprising a support and at least one adjacent layer comprising an interpolymer comprising units of the formula:

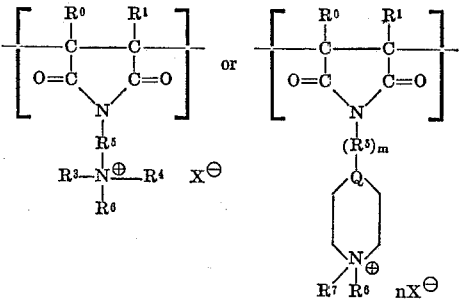

wherein $R^0$ and $R^1$ each represent hydrogen atoms or lower alkyl groups, $R^3$, $R^4$, $R^6$, and $R^7$ each represent lower alkyl groups or $R^3$ and $R^4$ can together with the nitrogen atom to which they are bonded represent the atoms necessary to complete a monoaza heterocyclic ring, $R^5$ represents an alkylene group, Q is a nitrogen atom, a

radical or a carbon radical, X is a negative salt-forming atom or radical, m is 0 or 1, and n is 1 or 2 and n is 1 when Q is a carbon radical, and n is 2 when Q is

and m is 1.

11. A method of preparing photographic images of high resolution comprising contacting in the presence of water (a) a photographic element containing at least one photographic dye image composed of a diffusible dye with (b) a dye imbibition printing blank consisting of a support and a layer comprising a hydrophilic colloid and an interpolymer containing units represented by the formula:

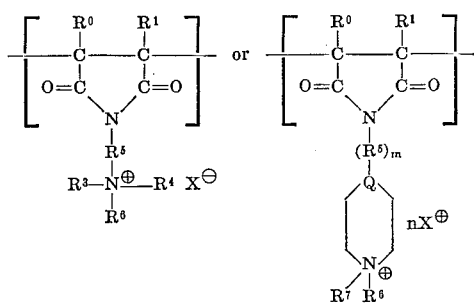 

wherein $R^0$ and $R^1$ each represent hydrogen atoms or lower alkyl groups, $R^3$, $R^4$, $R^6$, and $R^7$ each represent lower alkyl groups or $R^3$ and $R^4$ can together with the nitrogen atom to which they are bonded represent the atoms necessary to complete a monoaza heterocyclic ring, $R^5$ represents an alkylene group, Q is a nitrogen atom, a $$-\overset{|}{\underset{|}{N}}{}^{\oplus}-R^6$$

radical or a carbon radical, X is a negative salt-forming atom or radical, $m$ is 0 or 1, and $n$ is 1 or 2, and $n$ is 1 when Q is a carbon radical, and $n$ is 2 when Q is $$-\overset{|}{\underset{|}{N}}{}^{\oplus}-R^6$$

and $m$ is 1.

References Cited

UNITED STATES PATENTS

| | | | |
|---|---|---|---|
| 2,378,629 | 6/1945 | Hanford | 96—114 XR |
| 2,839,401 | 6/1958 | Houston et al. | 96—96 |
| 3,271,147 | 9/1966 | Bush | 96—29 |
| 3,271,148 | 9/1966 | Whitmore | 96—29 |

NORMAN G. TORCHIN, Primary Examiner

A. T. SURO PICO, Assistant Examiner

U.S. Cl. X.R.

96—114; 117—161; 260—88.3